United States Patent
Patz et al.

(10) Patent No.: US 11,435,765 B2
(45) Date of Patent: Sep. 6, 2022

(54) VALVE DEVICE, SYSTEM AND METHOD

(71) Applicant: Festo SE & Co. KG, Esslingen (DE)

(72) Inventors: Heiko Patz, Weilheim (DE); Ulrich Sixt, Waiblingen (DE); Sebastian Müller, Walddorfhäslach (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/317,444

(22) Filed: May 11, 2021

(65) Prior Publication Data

US 2021/0356975 A1 Nov. 18, 2021

(30) Foreign Application Priority Data

May 13, 2020 (DE) .......................... 102020206030.4

(51) Int. Cl.
*G05D 7/06* (2006.01)
*G05D 16/20* (2006.01)
*F15B 9/09* (2006.01)

(52) U.S. Cl.
CPC ............. *G05D 7/0635* (2013.01); *F15B 9/09* (2013.01); *G05D 7/0623* (2013.01);
(Continued)

(58) Field of Classification Search
CPC ............ G05D 16/2053; G05D 16/2022; Y10T 137/2544; Y10T 137/87169; F15B 9/09;
(Continued)

(56) References Cited

U.S. PATENT DOCUMENTS 4,417,312 A * 11/1983 Cronin ................ G01M 3/2807
137/487.5
5,094,260 A * 3/1992 Stuart .................. G05D 16/202
137/102
(Continued)

FOREIGN PATENT DOCUMENTS

DE 102016107407 A1 5/2017
DE 102016206822 A1 10/2017
DE 102018217337 A1 4/2020

*Primary Examiner* — William M McCalister
(74) *Attorney, Agent, or Firm* — Hoffmann & Baron LLP

(57) ABSTRACT

A valve device including an outlet port, a first valve unit with a first valve element for setting a first throttle opening for influencing a first airflow of pressurised air which is to be output at the outlet port or is to be released via the outlet port, a first throttle control loop for the closed-loop control of the first throttle opening according to a first setpoint, a pressure control loop for the closed-loop pressure control of an outlet pressure present at the outlet port to a pressure setpoint amid the use of a first throttle control loop as a subordinate control loop, wherein on closed-loop pressure control the pressure control loop specifies a first throttle setpoint to the first throttle control loop as the first setpoint, wherein the valve device is further configured to provide a throttle setting function and, within the throttle setting function, to limit the first throttle opening to a first limitation value and/or within the throttle setting function to specify a first direct setpoint which does not come from the closed-loop pressure control, to the first throttle control loop as the first setpoint.

13 Claims, 7 Drawing Sheets

(52) U.S. Cl.
CPC .. *G05D 16/2013* (2013.01); *F15B 2211/6306* (2013.01); *F15B 2211/6653* (2013.01); *F15B 2211/6656* (2013.01); *F15B 2211/7053* (2013.01); *G05D 16/2022* (2019.01)

(58) Field of Classification Search
CPC ...... F15B 2211/6306; F15B 2211/6653; F15B 2211/6656; F15B 2211/7053
USPC .................................................. 137/102, 596
See application file for complete search history.

(56) References Cited

U.S. PATENT DOCUMENTS

| | | | | |
|---|---|---|---|---|
| 5,460,196 | A * | 10/1995 | Yonnet | G05D 16/2095 137/12 |
| 5,586,575 | A * | 12/1996 | Bergamini | F15B 13/0438 137/488 |
| 5,615,832 | A * | 4/1997 | Price | B05B 7/1404 137/489.5 |
| 5,654,885 | A * | 8/1997 | Mayhew | F15B 9/09 700/282 |
| 5,660,198 | A * | 8/1997 | McClaran | G05D 16/106 137/12 |
| 6,171,066 | B1 * | 1/2001 | Irokawa | F15B 9/09 417/44.2 |
| 6,354,327 | B1 * | 3/2002 | Mayhew | F15B 9/09 137/596 |
| 6,453,261 | B2 * | 9/2002 | Boger | F15B 5/006 702/138 |
| 6,584,999 | B2 * | 7/2003 | Inayama | G05D 16/2024 137/487.5 |
| 7,283,894 | B2 * | 10/2007 | Esposito | F16K 37/0091 700/282 |
| 7,766,030 | B2 * | 8/2010 | Askew | F15B 5/006 137/85 |
| 8,695,623 | B2 * | 4/2014 | Horng | G05D 11/138 137/93 |
| 9,695,988 | B2 * | 7/2017 | Deville | F17D 1/04 |
| 2001/0054967 | A1 * | 12/2001 | Vanderah | G01F 1/363 340/626 |
| 2002/0117214 | A1 * | 8/2002 | Tucker | G05D 16/2053 137/487.5 |

* cited by examiner

VALVE DEVICE, SYSTEM AND METHOD

BACKGROUND OF THE INVENTION

The invention relates to a valve device, comprising an outlet port and a first valve unit with a first valve element for setting a first throttle opening. The first throttle opening serves for influencing a first airflow of pressurised air which is to be output at the outlet port. Alternatively, the first throttle opening serves for influencing a first airflow of pressurised air which is to be released into the outlet port.

The valve device further comprises a first throttle control loop for the closed-loop control of the first throttle opening according to a first setpoint.

The valve device further comprises a pressure control loop for the closed-loop pressure control of the outlet pressure via the use of the first throttle control loop as a subordinate control loop, wherein, for closed-loop pressure control, the pressure control loop specifies a first throttle setpoint to the first throttle control loop as the first setpoint.

SUMMARY OF THE INVENTION

An object of the invention lies in providing a valve device which can be used in a versatile manner.

The object is achieved by a valve device according to the present invention. The valve device is further configured to provide a throttle setting function and, via the throttle setting function, to limit the first throttle opening to a first limitation value and/or via the throttle setting function to specify a first direct setpoint, which does not come from the closed-loop pressure control, to the first throttle control loop as the first setpoint.

In particular, by way of providing the throttle setting function, it becomes possible to specify the first setpoint, according to which the first throttle opening is set, to the first throttle control loop in a direct manner (thus not via the closed-loop pressure control). By way of this, not only can the valve device be used as a closed-loop pressure controller, but in particular also as a closed-loop throttle controller and can therefore be used in a versatile manner. The valve device is preferably configured as a valve module. A closed-loop pressure controller as well as a closed-loop throttle controller can therefore be provided by way of a single valve device, in particular a single valve module.

Furthermore, by way of the throttle setting function it is possible to limit the first throttle opening to the first limitation value, in particular in the course of the closed-loop pressure control. The first limitation valve is smaller than a maximal possible first throttle opening. Expediently, the limitation value is smaller than a first throttle setpoint which is computed by the pressure control loop. The valve device in particular is configured to limit the first throttle setpoint which is computed by the pressure control loop, to the limitation value and to use the limited first throttle setpoint as the first setpoint for the first throttle control loop. By way of the limitation of the throttle opening, one can for example achieve that the outlet pressure increases more slowly (or drops more slowly) than without the limitation of the throttle opening. By way of the limitation of the throttle opening, in particular a speed of actuator element which is driven by the outlet pressure can be reduced. Consequently, the valve device can also be used for applications, in which a speed reduction of an actuator element is required. The valve device can therefore be used in a versatile manner.

The invention further relates to a system.

The invention further relates to a method. The method is expediently designed according to a described further development of the valve device.

BRIEF DESCRIPTION OF THE DRAWINGS

Exemplary embodiments are hereinafter explained with reference to the figures. Here are shown in.

DETAILED DESCRIPTION

Figure 1:
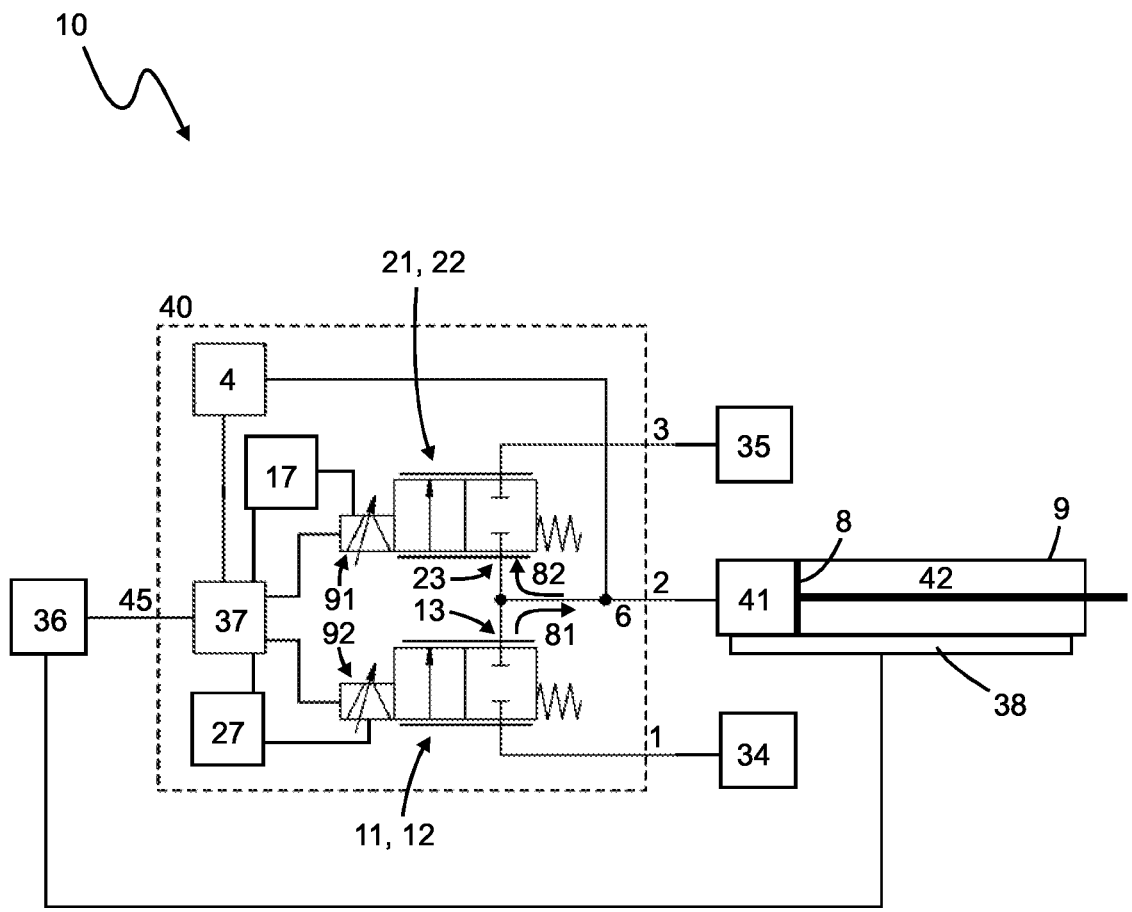
FIG. 1 a schematic representation of a first system with a valve device according to a first embodiment, FIG. 2 a block diagram of a pressure control loop of the valve device according to the first embodiment, FIG. 3 a schematic representation of a second system with a valve device according to a second embodiment, FIG. 4 a block diagram of a pressure control loop of the valve device according to the second embodiment, FIG. 5 a schematic representation of a third system with two valve devices, FIG. 6 a perspective view of a valve module, FIG. 7 a perspective view of a row module arrangement with several valve modules.
Figure 3:
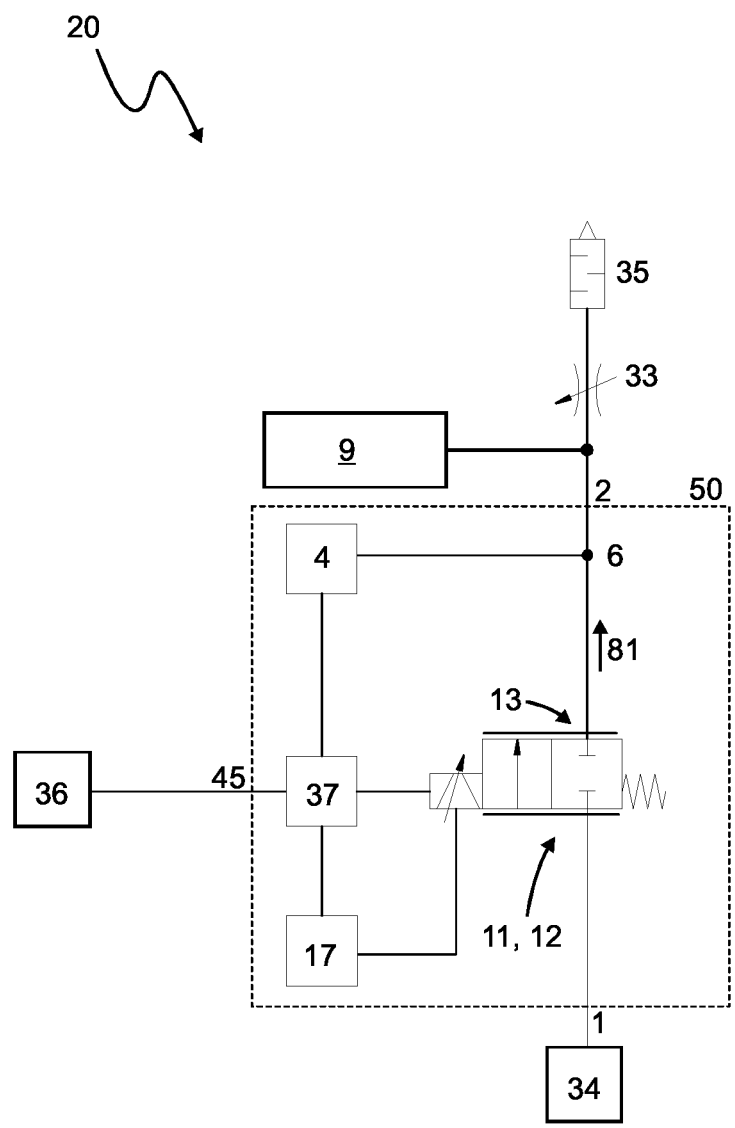

FIG. 1 shows a system 10 which can also be denoted as a first system 10. The system 10 comprises a valve device 40 according to a first embodiment. FIG. 3 shows a system 20 which can also be denoted as a second system. The system 20 comprises a valve device 50 according to a second embodiment.

The valve device 40 and the valve device 50 differ in that the valve device 40 comprises a first valve unit 11 and a second valve unit 21, whilst the valve device 50 only comprises the first valve unit 11. Aspects which are present for both valve devices 40 and 50 are firstly to be dealt with hereinafter. Herein, the "valve device 40, 50" is referred to, the meaning of which being the valve device 40 and the valve device 50 (on their own).

The valve device 40, 50 in particular serves for application in the field level. Expediently, the valve device 40, 50 is designed for industrial automation, in particular process automation and/or factory automation.

The valve device 40, 50 comprises an outlet port 2 and the first valve unit 11. The first valve unit 11 comprises a first valve element 12 for setting a first throttle opening 13.

The first throttle opening 13 serves for influencing a first airflow 81 of pressurised air which is to be output at the outlet port 2. According to an alternative design (not shown), the first throttle opening can also serve for influencing a first airflow of pressurised air which is to be released into the outlet port 2.

The valve device 40, 40 further comprises a first throttle control loop 14 (shown in the FIGS. 2 and 4) for the closed-loop throttle control of the first throttle opening 13 according to a first setpoint.

The valve device 40, 50 further comprises a pressure control loop 5 (shown in FIGS. 2 and 4) for the closed-loop pressure control of an outlet pressure 6 which prevails at the outlet port 2, to a pressure setpoint 7 via the use of the first throttle control loop 14 as a subordinate control loop.

The pressure control loop 5 is configured, for the closed-loop pressure control, to specify a first throttle setpoint 15 to the first throttle control loop 14 as the first setpoint.

The valve device 40, 50 is further designed to provide a throttle setting function and by way of the throttle setting function to limit the first throttle opening 13 to a first limitation value and/or by way of the throttle setting function to specify a first direct setpoint 16 which does not come from the closed-loop pressure control, to the first throttle control loop 14 as the first setpoint.

The throttle setting function therefore preferably serves for limiting the first throttle opening 13 to the first limitation value. Alternatively or additionally to this, the throttle setting function serves for specifying the first direct setpoint 16 to the first throttle control loop 14, whereby the valve device 40, 50 can be operated for example as a closed-loop throttle controller.

Hereinafter, a design where the throttle setting function serves for operating the valve device 40, 50 as a closed-loop throttle controller is firstly dealt with. This throttle setting function is also to be denoted as first throttle setting function. According to this design, the valve device 40, 50 is configured to selectively assume a closed-loop pressure control mode or a closed-loop throttle control mode. The closed-loop throttle control mode and the closed-loop pressure control mode are preferably different operating modes, in particular alternative operating modes, of the valve device 40, 50. The valve device can (at a given point in time) expediently either assume the closed-loop throttle control mode or the closed-loop pressure control mode.

Firstly to the closed-loop pressure control mode:

In the closed-loop pressure control mode, the valve device 40, 50 functions as a closed-loop pressure controller and carries out the closed-loop pressure control. In the closed-loop pressure control mode, the first throttle setpoint 15 (coming from the closed-loop pressure control) is used as the first setpoint for the subordinate closed-loop throttle control. In the closed-loop pressure control mode, the direct setpoint 16 is not used as the first setpoint for the subordinate closed-loop throttle control. In the closed-loop pressure control mode, the valve device 40, 50 closed-loop controls the outlet pressure 6 to a pressure setpoint 7 and for this purpose specifies the first throttle setpoint 15 as the first setpoint. The pressure setpoint 7 by way of example is specified by an external unit, for example a superordinate control 36. In particular, the valve device 40, 50 receives the pressure setpoint 7 via a communication interface 45. According to a further exemplary design, the pressure setpoint 7 can be inputted into the valve device 40, 50 by a user, for example via an operating device 46. According to a further exemplary design, the pressure setpoint 7 can be provided, in particular computed, by the valve device 40, 50, in particular a control unit 37 of the valve device 40, 50.

Now to the closed-loop throttle control mode:

In the closed-loop throttle control mode, the valve device 40, 50 functions as a closed-loop throttle controller and expediently does not carry out the closed-loop pressure control. Furthermore, the (first) throttle setting function is activated in the closed-loop throttle control mode, so that the valve device 40, 50 specifies the first direct setpoint 16 to the first throttle control loop 14 as the first setpoint. In the closed-loop throttle control mode, the throttle setpoint 15 is not used as the first setpoint for the closed-loop throttle control. In the closed-loop throttle control mode, the closed-loop throttle control is not subordinate to a closed-loop pressure control. In the closed-loop throttle control mode, the closed-loop throttle control is independent of the outlet pressure 6. In the closed-loop throttle control mode, the valve device 40, 50 close-loop controls the first throttle opening to the first direct setpoint 16. The direct setpoint 16 by way of example is specified by an external unit, for example the superordinate control 36. In particular, the valve device 40, 50 receives the direct setpoint 16 via a communication interface 45. According to a further exemplary design, the direct setpoint 16 can be inputted into the valve device 40, 50 by a user, for example via an operating device 46. According to a further exemplary design, the direct setpoint 16 can be provided, in particular computed, by the valve device 40, 50, in particular the control unit 37 of the valve device 40, 50.

In the closed-loop throttle control mode, the valve device 40, 50 expediently executes a closed-loop travel control of the first valve element 12 of the first valve unit 11. The closed-loop throttle control mode can also be denoted as a closed-loop travel control mode.

The valve device 40, 50 can preferably switch between the closed-loop pressure control mode and the closed-loop throttle control mode, in particular by way of activating or deactivating the (first) throttle setting function. According to a preferred design, the switching between the closed-loop pressure control mode and the closed-loop throttle control mode can be effected by a user, for example via an operating device 46. According to a further preferred design, the switching between the closed-loop pressure control mode and the closed-loop throttle control mode can be effected by an external unit, in particular the superordinate control 36. For example, the switching can be effected via the communication interface 45, preferably via the IO-link. A switching from the closed-loop pressure control to the closed-loop throttle control, in particular to the closed-loop travel control, is preferably effected via the operating device 46, in particular via a menu at the valve device 40, 50 or via a bus protocol, e.g. IO-link.

A design where the throttle setting function serves for limiting the first throttle opening 13 to the first limitation value is to be dealt with hereinafter. This throttle setting function is also to be denoted as a second throttle setting function.

According to this design, the valve device 40, 50 is configured, in particular in closed-loop pressure control, to activate the throttle setting function, in order to limit the first throttle opening 13 to the first limitation value. The first limitation value expediently represents a maximal size of the first throttle opening 13 which can be assumed for the purpose of the closed-loop pressure control. This maximal size of the first throttle opening 13 which is specified by the first limitation value is smaller than the actual maximal size of the first throttle opening 13 which can preferably be assumed when the throttle setting function is not activated. A limitation of the maximal throttle opening thus take place, so that a reduced (maximal) throttle opening is provided for the closed-loop pressure control as a maximal throttle opening. In particular, a travel reduction of the maximal travel of the first valve element 12 takes place by way of the throttle setting function.

The throttle setting function for the purpose of the limitation of the first throttle opening 13 can be activated and/or deactivated for example via the operating device 46, the communication interface 45 and/or automatically by the valve device 40, 50.

The valve device 40, 50 is preferably designed to automatically deactivate the throttle setting function in response to a detection criterion being fulfilled.

The deactivation criterion is for example an outlet pressure threshold value for the outlet pressure 6. The outlet pressure 6 by way of example is detected by the pressure sensor 4. In response to the outlet pressure 6 reaching the output pressure threshold value, the valve device 40, 50 automatically deactivates the throttle setting function, so that the first throttle opening is no longer limited to the first limitation value. Expediently, given a deactivated throttle setting function, the first throttle opening 13 can assume its actual maximum size; in particular the first valve element 12 can execute a full travel given a deactivated throttle setting function.

Furthermore, the deactivation criterion can be a position threshold value for the position of an actuator element 8 of a pneumatic actuator 9 which is to be actuated by way of the outlet pressure 6. As a response to the actuator element 8 reaching the position threshold value, for example an end position, the valve device 40, 50 deactivates the throttle setting function, so that the first throttle opening 13 is no longer limited to the first limitation value. The position threshold value is expediently an end position of the actuator element 8. By way of example, the position of the actuator element 8 is detected by way of a position sensor 38 which in particular is arranged on the actuator 9. By way of example, the position sensor 38 is communicatively connected to the superordinate control 36. Preferably, the superordinate control 36 examines, on the basis of the detected position of the actuator element 8, whether the position threshold is reached and on the basis of this examination communicates with the valve device 40, 50, in particular via IO-link, in order to effect the valve device 40, 50 deactivating the throttle setting function when the position threshold is reached. According to an alternative design, the valve device 40, 50 can be connected directly to the position sensor 38 and/or itself check, on the basis of the detected position of the actuator element 8, whether the position threshold value is reached and to deactivate the throttle setting function on the basis of the check. The switching from the limitation of the maximal travel to full travel in particular can be effected via a bus protocol, e.g. IO-link.

Preferably, the valve device 40, 50 is designed to actuate the actuator element 8 of the pneumatic actuator 9 with the outlet pressure 6 and on actuation in a movement phase of the actuator 8 to activate the throttle setting function, in order to limit the first throttle opening 13 to the first limitation value, and in a holding phase of the actuator element 8 to deactivate the throttle setting function, so that the first throttle opening is not limited to the first limitation value. Expediently, the pressure control loop 5 is configured, in the holding phase, to specify a throttle setpoint 15 which is larger than the first limitation value, as the first setpoint.

By way of the provision of the pressurised air at the outlet port 2, a first pressure chamber 41 of the actuator 9 is filled with pressurised air, the effect of which being that the actuator element 8 is set into motion. The aforementioned movement phase is the time interval, in which the actuator element 8 moves on account of the provision of the pressurised air. The movement phase can also be denoted as a first movement phase. During this movement phase, the first throttle opening 13 is reduced to the first limitation value, by which means the first airflow 81 is reduced. On account of the reduced first airflow 81, the rate of change of the pressure in the first pressure chamber 41 is reduced, so that the pressure increases more slowly. This leads to the actuator element 8 moving with a reduced speed in the movement phase.

The aforementioned holding phase is that time interval, in which the actuator element 8 is no longer moved and is held in a position via the provided pressurised air. For example, the actuator element 8 is in an end position in the holding phase. In the holding phase, the actuator element 8 expediently presses upon an actuation object (not shown in the figure). In the holding phase, the first throttle opening 13 is not reduced, so that the maximal possible throttle opening 13 is available for the closed-loop pressure control. In the holding phase, a larger first airflow 81 than in the movement phase can therefore be provided, so that the pressure which is required in the holding phase is reached more quickly, in particular can be built up more quickly.

As a result, on movement, in particular on extending the actuator element 8, other pressures can be present than in the end position. For this, it is not necessary for the user to have to input detailed data on the application. A very simple possibility is provided and this neither necessitates additional sensor means, nor the input of complex application parameters, in order to permit both a speed-reduced moving of the actuator element 8 and a (high) operating pressure in the end positions of the pneumatic actuator 9. Preferably, the first valve unit 11 is operated with a reduced maximal travel, so that the feed air, or, as explained hereinafter, the outgoing air of the pneumatic actuator 9 can be throttled (in particular separately from one another). A slow retraction and/or extension of the actuator element 8 is possible with this. The end force expediently remains high.

The deactivation of the throttle setting function is expediently effected as a response to the deactivation criterion being fulfilled, as explained above. In particular, the outlet pressure threshold value serves as the deactivation criterion. The reaching of the outlet pressure threshold value can serve as an indicator that the actuator element 8 does not move any further, in particular does not extend any further, so that the first pressure chamber 41 does not expand further and the pressure in the first pressure chamber 41 increases more greatly.

Preferably, the switching-over to the maximal throttle opening, in particular to full travel is effected as soon as a certain pressure level is reached (and thus no pressurised air subsequently flows, accordingly a movement of the actuator element 8 no longer takes place).

Hereinafter, the system 10 which is shown in FIG. 1 is to be dealt with in more detail.

The system 10 comprises the valve device 40, the pneumatic actuator 9, a pressurised air source 34, a pressurised air sink 35 and optionally the superordinate control 36. The system 10 serves as an exemplary application environment for the valve device 40. The valve device 40 can also be provided on its own—thus without the other components of the system 10.

The pneumatic actuator 9 by way of example is a drive cylinder. The pneumatic actuator 9 expediently comprises as the actuator element 8 a piston with a piston rod. The pneumatic actuator 9 is preferably designed in a dual-acting manner and comprises the first pressure chamber 41 and a second pressure chamber 42. The first pressure chamber 41 is connected onto the outlet port 2. The second pressure chamber 42 is preferably connected to a further valve device which is not shown and which is preferably designed as the valve device 40. By way of example, the position sensor 38 is attached to the pneumatic actuator 9.

The superordinate control 36 by way of example is a programmable logic controller, PLC. The superordinate control is communicatively connected to the valve device 40. The superordinate control is further communicatively connected to the position sensor 38.

The valve device 40 comprises the first valve unit 11 and a second valve unit 21. The valve device 40 further comprise a pressure sensor 4, a control unit 37 which in particular is designed as a microcontroller, a first throttle sensor 17 and a second throttle sensor 27. The valve device 40 further comprises an outlet port 2, a pressurised air source port 1 and a pressurised air sink port 3.

The second valve unit 21 has a second valve element 22 for setting a second throttle opening 23 for influencing a second airflow 82 of pressurised air which is to be released into the outlet port 2. The valve device 40 comprises a second throttle control loop 24 for the closed-loop throttle control of the second throttle opening 23 according to a second setpoint. The pressure control loop 5 is configured to further carry out the closed-loop pressure control of the outlet pressure 6 via the use of the second throttle control loop 24 as a subordinate control loop and for closed-loop pressure control to specify a second throttle setpoint 25 to the second throttle control loop 24 as the second setpoint.

In particular, the valve device 40 is designed to limit the second throttle opening 23 to a second limitation value by way of the throttle setting function and/or to specify a second direct setpoint 26 which does not come from the closed-loop pressure control, to the second throttle control loop 24 as the second setpoint, by way of the throttle setting function.

The first valve unit 11 and/or the second valve unit 21 are expediently designed as a 2/2-way valve. The actuation of the first valve element 12 and/or of the second valve element 22 is expediently effected in an electrical, in particular electrodynamic manner By way of example, the first valve unit 11 comprises a first electrical valve element drive 91 which in particular is designed as a first plunger coil drive. By way of example, the second valve unit 21 comprises a second electrical valve element drive 92 which in particular is designed a second plunger coil drive. The first valve element drive 91 and/or the second valve element drive 92 are preferably controlled by the control unit 37. The first valve element 12 and/or the second valve element 22 are expediently closed-loop travel controlled in an active manner. The closed-loop travel control can also be denoted as a closed-loop path control or closed-loop stroke control.

Via the first valve unit 11, pressurised air from the pressurised air source 34 is provided at the outlet port 2, in particular in order to increase the output pressure 6 which prevails at the outlet port 2. Via the second valve unit 21, pressurised air is released from the outlet port 2 into the pressurised air sink 35, in order to decrease the outlet pressure 6 which prevails at the outlet port 2.

Firstly to the valve unit 11:

The first valve unit 11 controls the first airflow 81. The first airflow 81 runs from the pressurised air source port 1 of the valve device 80 through the first throttle opening 13 to the outlet port 2. By way of example, the pressurised air of the first airflow 81 comes from the pressurised air source 34 which is connected to the pressurised air source port 1. The first airflow 81 is issued out of the valve device 40 at the outlet port 2. By way of example, the first pressure chamber of the pneumatic actuator 9 is connected to the outlet port 2. The pressurised air of the first airflow 81 is fed to the first pressure chamber 41 of the pneumatic actuator 9 via the first outlet port 2. By way of example, the first valve element 12 is a valve element which is closed-loop travel controlled in a proportional manner. The size of the first throttle opening 13 can be set via the closed-loop travel control of the first valve element 12. The travel of the first valve element 12 can be closed-loop controlled to a maximal travel, at which the size of the first throttle opening 13 is maximal. The travel of the first valve element 12 can further be closed-loop controlled to a minimum travel, at which the size of the first throttle opening 13 is minimal—for example the first throttle opening 13 is closed at minimal travel. The travel of the first valve element 12 can further be closed-loop controlled to a plurality of intermediate travels between the maximal travel and the minimal travel, at which the size of the first throttle opening 13 is between the maximal size and the minimal size. The size of the first throttle opening 13 in particular is proportional to the travel of the first valve element 12. The first airflow 81 is limited by way of a reduction of the size of the first throttle opening 13. By way of this, one achieves for example that the pressure in the first pressure chamber 41 is built up more slowly.

The second valve unit 21 is expediently designed in a manner corresponding to the first valve unit 11:

The second valve unit 21 controls the second airflow 82. The second airflow 82 runs from the outlet port 2 of the valve device 40 through the second throttle opening 23 to a pressurised air sink port 3. By way of example, the pressurised air of the second airflow 82 is issued into the pressurised air sink 35 for example the atmosphere, via the pressurised air sink port 3. By way of example, the second airflow 82 runs from the first pressure chamber 41 of the pneumatic actuator 9 via the outlet port 2 to the pressurised air sink port 3. By way of example, the second valve element 22 is a valve element which is closed-loop travel controlled in a proportional manner. The size of the second throttle opening 23 can be adjusted via the closed-loop control of the travel of the second valve element 22. The travel of the second valve element 22 can be closed-loop controlled to a maximal travel, at which the size of the second throttle opening 23 is maximal. The travel of the second valve element 22 can further be closed-loop controlled to a minimal travel, at which the size of the first throttle opening 23 is minimal—for example the first throttle opening 23 is closed given minimum travel. The travel of the second valve element 22 can further be closed-loop controlled to a plurality of intermediate travels between the maximal travel and the minima travel, at which the size of the second throttle opening 23 is between the maximal and minimal size. The size of the second throttle opening 23 in particular is proportional to the travel of the second valve element 22. The second airflow 82 is limited by way of a reduction of the size of the second throttle opening 23. By way of this, one achieves for example that the pressure in the first pressure chamber 41 is reduced more slowly.

The pressure control loop 5 is to be dealt with in more detail next.

Figure 2:
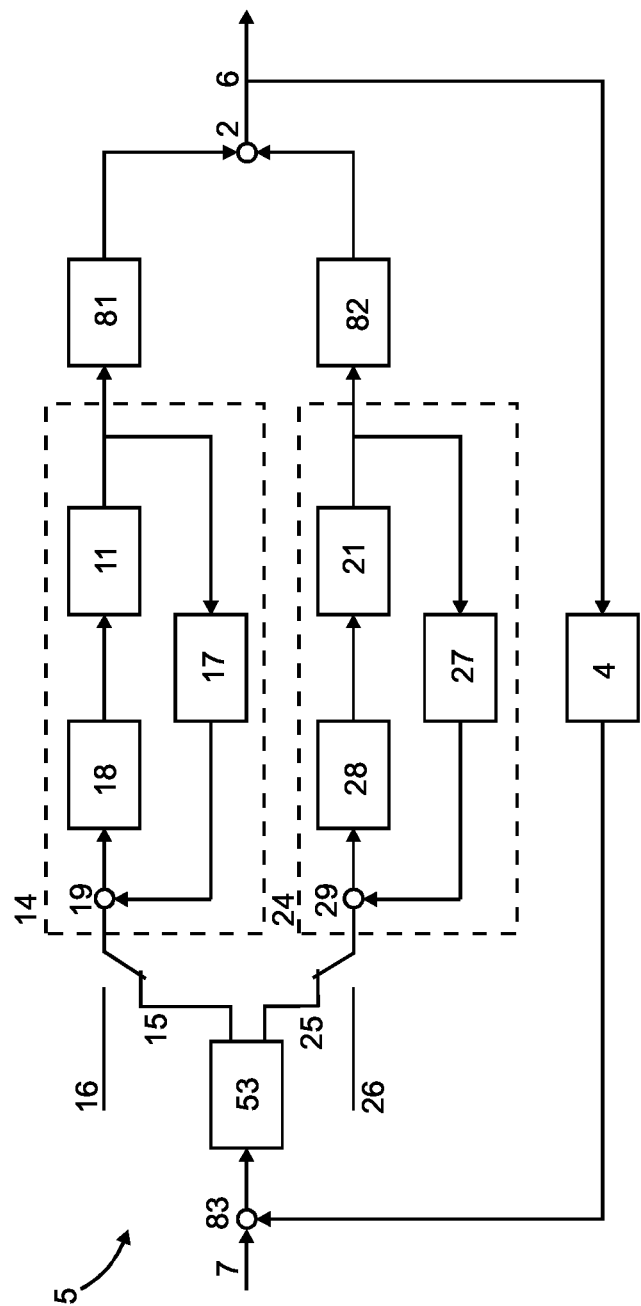

FIG. 2 shows an exemplary design of the pressure control loop 5. The pressure control loop 5 comprises the first throttle control loop 14 as a subordinate control loop. By way of example, the pressure control loop 5 further comprises the second throttle control loop 24 as a subordinate control loop. The pressure control loop 5 and the first throttle control loop 14 and expediently also the second throttle control loop 24 are cascaded.

The pressure control loop 5 comprises a pressure subtraction element 83, a closed-loop pressure controller unit 53 and the pressure sensor 4. The pressure subtraction element 83 and the closed-loop pressure controller unit 53 are expediently carried out by the control unit 37. The pressure subtraction element 83 computes a pressure error signal on the basis of the pressure setpoint 7 and a pressure feedback signal which is provided by the pressure sensor 4. The closed-loop pressure controller unit 53 produces the first throttle setpoint 15 and the second throttle setpoint 25 (if the second throttle control loop 24 is present) on the basis of the pressure error signal.

The first throttle setpoint 15 for example specifies a desired travel for the first valve element 12. The first throttle setpoint 15 is transferred to the first throttle control loop 14 as the first setpoint. The size of the first throttle opening 13 is set according to the first throttle setpoint 15, so that the first airflow 81 results.

The second throttle setpoint 25 for example specifies a desired travel for the second valve element 22. The second throttle setpoint 25 is transferred to the second throttle control loop 24 as the second setpoint. The size of the second throttle opening 23 is set according to the second throttle setpoint 25, so that the second airflow 82 results.

The first airflow 81 and the second airflow 82 are brought together at the outlet port 2 and provide the outlet pressure at the outlet port 2. The outlet pressure 6 is detected by the pressure sensor 4 and is led back to the pressure subtraction element 83 as a pressure feedback signal.

The valve device 40 comprises the first throttle control loop 14 for carrying out the closed-loop throttle control of the first throttle opening 13. By way of example, the first closed-loop throttle control is effected by way of the closed-loop control of the travel of the first valve element 12. The first closed-loop throttle control can also be denoted as a first closed-loop travel control.

The throttle control loop 14 by way of example comprises a first subtraction element 19, a first closed-loop throttle controller unit 18, the first valve unit 11 and the first throttle sensor 17. The first subtraction element 19 and the first closed-loop throttle controller unit 18 are expediently carried out by the control unit 37. The first throttle control loop 14 closed-loop controls the first throttle opening 13 to a first setpoint. The first setpoint for example defines a travel for the first valve element 12. The first setpoint is selectively the first throttle setpoint 15 or the first direct setpoint 16.

The first subtraction element 19 computes a first error signal on the basis of the first setpoint and of a feedback signal which is provided by the first throttle sensor 17. The first throttle sensor 17 by way of example is a travel sensor for detecting the travel of the first valve element 12 and as the feedback signal outputs the actual travel of the first valve element 12. Expediently, the first throttle sensor 17 comprises a magnet sensor, in particular Hall sensor.

The first closed-loop throttle controller unit 18 produces a first control signal for the first valve unit 11 on the basis of the first error signal. The first control signal in particular is an electrical control signal. The first valve unit 11 sets the travel of the first valve element 12—and thus the size of the first throttle opening 13—on the basis of the first control signal. In particular, the first valve unit 11 sets the travel of the first valve element 12 proportionally to the first control signal.

The valve device 40 further comprises a second throttle control loop 24 for carrying out a second closed-loop throttle control of the second throttle opening 13. By way of example, the second closed-loop throttle control is effected by way of the closed-loop control of the travel of the second valve element 22. The second closed-loop throttle control can also be denoted as a second closed-loop travel control.

The second throttle control loop 24 by way of example comprises a second subtraction element 29, a second closed-loop throttle controller unit 28, the second valve unit 21 and a second throttle sensor 27. The second throttle control loop 24 closed-loop controls the second throttle opening 23 to the second setpoint. The second setpoint for example specifies a travel for the second valve element 22. The second setpoint is selectively the second throttle setpoint 25 or the second direct setpoint 26.

The second subtraction element 29 computes a second error signal on the basis of the second setpoint and of a second feedback signal which is provided by the second throttle sensor 27. The second throttle sensor 27 by way of example is a travel sensor for detecting the travel of the second valve element 22 and as a feedback signal outputs the actual travel of the second valve element 22. Expediently, the second throttle sensor 27 comprises a magnet sensor, in particular Hall sensor.

The second closed-loop throttle controller unit 28 generates a second control signal for the second valve unit 21 on the basis of the second error signal. The second control signal in particular is an electrical control signal. The second valve unit 21 sets the travel of the second valve element 22—and thus the size of the second throttle opening 23—on the basis of the second control signal. In particular, the second valve element 22 sets the travel of the second valve element 22 proportionally to the second control signal.

In the closed-loop pressure control mode, the first throttle setpoint 15 and the second throttle setpoint 25 are specified, in particular computed, by the pressure control loop 5, in particular the closed-loop pressure controller unit 53. The throttle setpoints 15, 16 in the closed-loop pressure control mode result from the closed-loop pressure control; the throttle setpoints 15, 16 are computed in particular on the basis of the outlet pressure 6 and/or the pressure setpoint 7, preferably on the basis of the pressure error signal.

In the closed-loop throttle control module, the direct setpoints 16, 26 are specified for example by the control unit 37 and/or the superordinate control 36. The direct setpoints 16, 26 are not specified by the pressure control loop 5, in particular not by the closed-loop pressure controller unit 53, in particular not calculated by the pressure control loop 5 and/or the closed-loop pressure controller unit 53. The direct setpoints 16, 26 do not result from the closed-loop pressure control; the direct setpoints 16, 26 in particular are not computed on the basis of the outlet pressure 6 and/or not on the basis of the pressure setpoint 7, preferably not on the basis of the pressure error signal.

The valve device 40 is preferably designed to limit the second throttle opening 23 to a second limitation value by way of the throttle setting function. The limitation of the second throttle opening 23 to the second limitation value in particular is effected in correspondence with the initially mentioned limitation of the first throttle opening 13 to the first limitation value. The valve device 40 in particular is designed, for a de-aeration of the first pressure chamber 41, to activate the throttle setting function and to limit, in particular reduce, the second throttle opening 23 to the second limitation value. The limitation of the second throttle opening 23 to the second limitation value in particular is effected during a second movement phase of the actuator element 8. In the second movement phase, a de-aeration of the pressure chamber 41 takes place via the outlet port 2. The actuator element 8 is retracted in the second movement phase. In the second movement phase, the first throttle opening 13 is expediently completely closed. In the first movement phase which has been explained above, the second throttle opening 23 is expediently completely closed.

Hence a simple throttling (travel reduction) of the feed air, in particular of the first airflow 81, or of the outgoing air, in particular of the second airflow 82, from a closed-loop pressure controlled volume, by way of example the first pressure chamber 41, can be set by way of the valve device 40, expediently via a menu, in particular via the operating device 46 on the valve device 40.

FIG. 3 shows the system 20 which can be denoted as a second system. The system 20 comprises the valve device 50 according to the second embodiment. The system 20 further comprises the pneumatic actuator 9, the pressurised air source 34, the pressurised air sink 35 and optionally the superordinate control 36. The system 20 serves as an exemplary application environment for the valve device 50. The valve device 50 can also be provided on its own—thus without the other components of the system 10.

Figure 4:
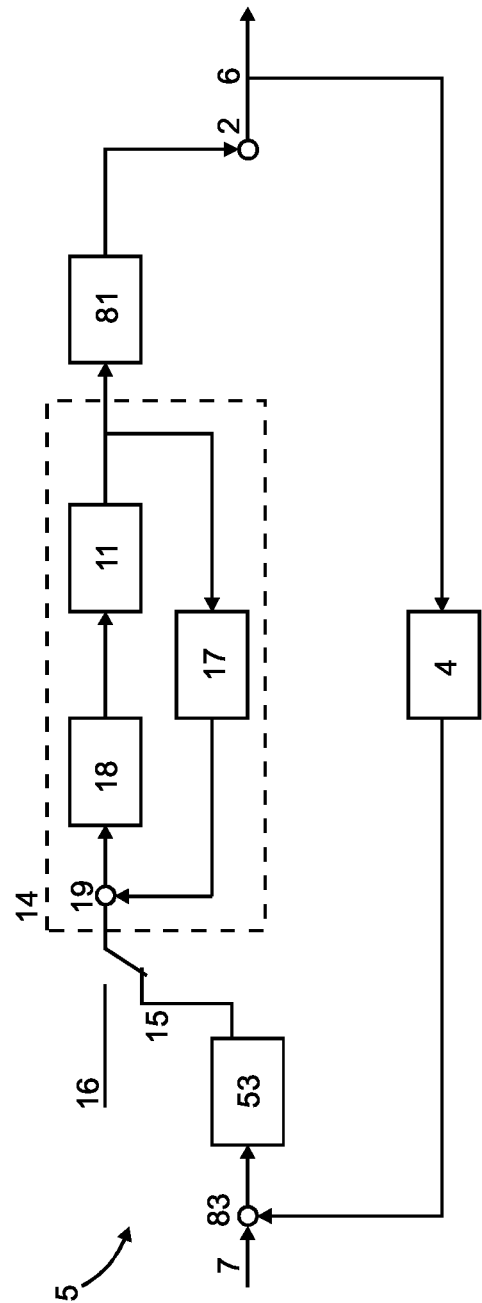

The valve device 50 is expediently designed as the valve device 40, with the difference that the valve device 50 does not comprise the second valve unit 21 or the second valve unit 21 is not used (e.g. for the closed-loop pressure control). In particular, the valve device 50 does not comprise the second throttle control loop 24 or does not use this (e.g. for the closed-loop pressure control). Accordingly, the pressure control loop 5 which is shown in FIG. 4 does not comprise two but only one subordinate throttle control loop. The closed-loop pressure control loop 5 of FIG. 4 is otherwise designed expediently as the closed-loop pressure control loop 5 of FIG. 2.

The explanations made with respect to the valve device 40 expediently also apply to the valve device 50. The valve device 50 comprises the first valve unit 11, the pressure sensor 4, the control unit 37 and the first throttle sensor 17. The valve device 50 further comprises the pressurised air source port 1 and the outlet port 2.

The first valve unit 11 serves in the valve device 50 (as in the valve device 40) for influencing the first airflow 81 of pressurised air which is to be issued at the output port 2. Via the first valve unit 11, the outlet pressure 6 can therefore be increased (by feeding of pressurised air).

According to a (not shown) alternative design, the first throttle opening can serve for influencing an airflow of pressurised air which is to be discharged into the outlet port 2. Concerning this alternative design, the first valve unit 11 would serve for reducing the outlet pressure 6 (by way of discharging pressurised air).

By way of example, the system 20 comprises an external outlet throttle 33 which is connected to the outlet port 2 and which serves for continuously discharging pressurised air. The throttle opening of the external outlet throttle 33 is expediently smaller than the maximal first throttle opening 13. Expediently, the valve device 50 is designed to set the first throttle opening 13 to a first size, at which more pressurised air is fed to the outlet port 2 via the first valve unit 11 than is discharged via the external outlet throttle 33, so that the outlet pressure 6 is increased. Expediently, the valve device 50 is further designed to set the first throttle opening 13 to a second size, at which the less pressurised air is fed to the outlet port 2 via the first valve unit than is discharged via the external outlet throttle 33, so that the outlet pressure 6 is reduced.

The valve device 50 is configured, by way of the first valve unit 11 (and in particular without a/the second valve unit 21) to provide the closed-loop pressure control at the outlet port 2, in order to closed-loop control the outlet pressure 6 to the pressure setpoint 7. An increase of the outlet pressure 6 which is to be carried out in the course of the closed-loop pressure control is effected by way of a feed of pressurised air via the first valve unit 11. A reduction of the outlet pressure 6 which is to be carried out in the course of a closed-loop pressure control is effected by way of a discharge of pressurised air via the external outlet throttle 33.

The throttle opening of the external outlet throttle 33 is expediently set in a fixed manner. The throttle opening of the external outlet throttle 33 is expediently subjected to no open-loop control and/or no closed-loop control.

In particular, by means of the valve device 50, a flow throttling—thus a reduction of the first airflow 81—with a simultaneous pressure limitation—in particular by the closed-loop pressure control of the outlet pressure 6—can be achieved.

Figure 5:
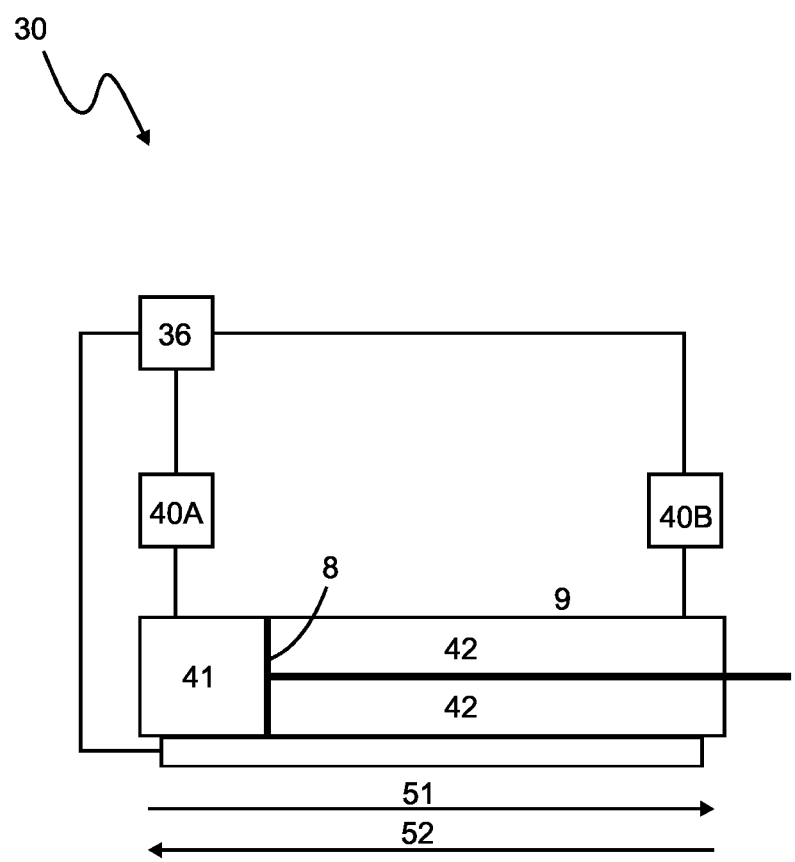

FIG. 5 shows a system 30 which can also be denoted as a third system. The system 30 comprises a first valve device 40A which is configured like the valve device 40. The system 30 further comprises a second valve device 40B which is configured like the valve device 40.

The system 30 further comprises the superordinate control 36, which is expediently communicatively connected to the first valve device 40A and the second valve device 40B.

The system 30 further comprises a pneumatic actuator 9. The pneumatic actuator 9 is expediently designed as a dual-acting actuator. The pneumatic actuator 9 comprises the first pressure chamber 41 and the second pressure chamber 42.

The system 30 is configured to carry out a first actuation 51 of the pneumatic actuator 9 and, for the first actuation 51, to aerate the first pressure chamber 41 via the first valve device 40A, wherein the first valve device 40A is in the closed-loop pressure control mode, and to de-aerate the second pressure chamber 42 via the second valve device 40B, wherein the second valve device 40B is in the closed-loop throttle control mode.

For example, an actuation command, according to which the first actuation 51 of the actuator element 8 is to be carried out, is provided in the superordinate control 36. The first actuation 51 in particular is a first movement of the actuator element 8 in a first movement direction. The superordinate control 36 controls the two valve devices 40A, 40B according to the actuation command. For example, the superordinate control 36 controls the first valve device 40B such that the first valve device 40A is operated in the closed-loop pressure control mode and closed-loop controls the pressure of the first pressure chamber 42 according to the pressure setpoint 7. In particular, the superordinate control 36 outputs the pressure setpoint 7 to the first valve device 40A and/or outputs a mode command, the effect of which being that the first valve device 40A is to be operated in the closed-loop pressure control mode.

Furthermore, the superordinate control 36 controls the second valve device 40B such that the second valve device 40B is operated in the closed-loop throttle control mode and the first throttle opening 13 and/or the second throttle opening 23 of the second valve device 40B is closed-loop controlled according to the first direct setpoint 16 and/or the second direct setpoint 26. In particular, the superordinate control outputs the first direct setpoint 16 and/or the second direct setpoint 26 to the second valve device 40B.

The system 30 is expediently further designed to carry out a second actuation 52 of the pneumatic actuator 9 and, for the second actuation, to de-aerate the first pressure chamber 41 via the first valve device 40A, wherein the first valve device 40A is in the closed-loop throttle control mode, and to aerate the second pressure chamber 42 via the second valve device 40B, wherein the second valve device 40B is in the closed-loop pressure control mode.

For example, an actuation command, according to which the second actuation 52 of the actuator element 8 is to be carried out, is provided in the superordinate control 36. The second actuation 52 in particular is a second movement of the actuator element 8 in a second movement direction (for example opposite to the first movement direction). The superordinate control 36 controls the two valve devices 40A, 40B according to the actuation command. For example, the superordinate control 36 controls the second valve device 40B such that the second valve device 40B is operated in the closed-loop pressure control mode and closed-loop controls the pressure of the second pressure chamber 42 according to the pressure setpoint 7. In particular, the superordinate control 36 outputs the pressure setpoint 7 to the second valve device 40B and/or outputs a mode command, the effect of which being that the second valve device 40B is to be operated in the closed-loop pressure control mode.

Furthermore, the superordinate control 36 controls the first valve device 40A such that the first valve device 40A is operated in the closed-loop throttle control mode and the first throttle opening 13 and/or the second throttle opening 23 of the first valve device 40A is closed-loop controlled according to the first direct setpoint 16 and/or the second direct setpoint 26. In particular, the superordinate control outputs the first direct setpoint 16 and/or the second direct setpoint 26 to the first valve device 40A.

The system 30 in particular is thus designed to operate the valve devices 40A, 40B in dependence on the direction of the actuation which is to be carried out selectively in the closed-loop pressure control mode—thus as a closed-loop pressure controller—or in the closed-loop throttle control mode—thus as a closed-loop throttle controller.

Figure 6:
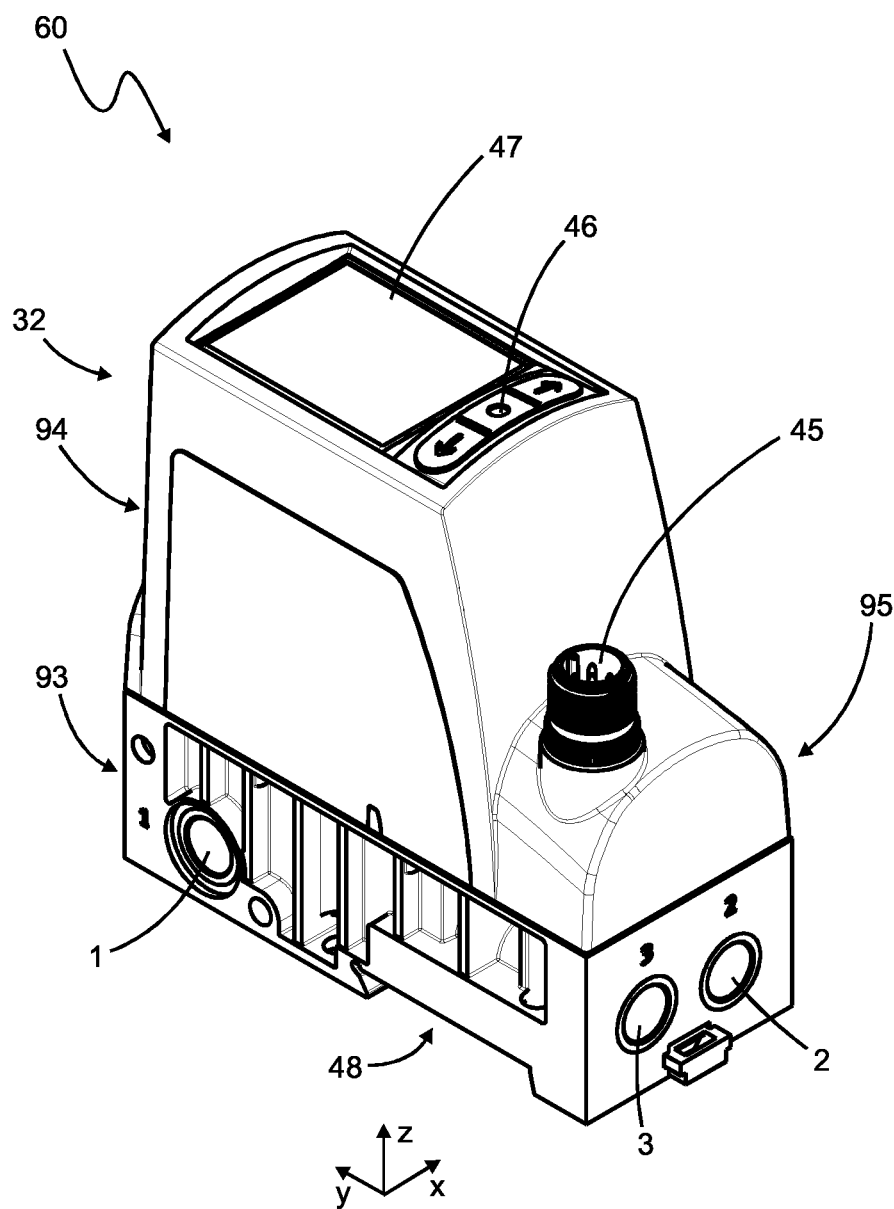

FIG. 6 shows a valve module 60 which is an exemplary design of the valve device 40, 50. The valve module 60 comprises a valve module housing 32, in which the first valve unit 11 and (if it is present) the second valve unit 21 are arranged. Preferably, the pressure sensor 4, the control unit 37, the first throttle sensor 17 and/or the second throttle sensor 27 (if it is present) are arranged in the valve module housing 32. The output port 2, the pressurised air source port 1 and (if it is present) the pressurised air sink port 3 are arranged on the valve module housing 32 at the outside.

The valve module 60 is expediently dimensioned such that it can be manually carried by the user, in particular by hand. The valve module 60 can be expediently handled as a unit.

The valve module 60, in particular the valve module housing 32, expediently comprises a cuboid and/or plate-like basic shape. The x-extension is expediently smaller than the y-extension and/or smaller than the z-extension. The x-direction, y-direction, and z-direction are aligned orthogonally to one another. The x-direction and the y-direction can also be denoted as horizontal directions and the z-direction as a vertical direction or height direction. The valve module 60 comprises two longitudinal sides which are aligned perpendicularly to the x-direction and which are expediently designed in an essentially planar manner Expediently, a further valve module 60 can be mechanically and/or fluidically coupled to each longitudinal side, in order to form a row module arrangement. The valve module 60 by way of example is designed as a row module.

The pressurised air source port 1 is expediently arranged on one longitudinal side. The valve module 60 furthermore comprises two face sides which are aligned perpendicularly to the y-direction. By way of example, the pressurised air sink port and/or the outlet port 2 is arranged on a face side.

The valve module 60 comprises a lower section 93, on which expediently an upper section 94 and a shoulder section 95 are arranged next to one another in the y-direction. By way of example, the pressurised air source port 1, the pressurised air sink port 3 and the outlet port 2 are arranged on the lower section 93. Expediently, the communication interface 45 is arranged on the shoulder section 95. By way of example, the operating device 46 and/or a display unit 47 are arranged on the upper section 94, in particular on the upper side of the valve module 60. The upper side by way of example is aligned normally to the z-direction.

The valve module 60 expediently comprises a fastening interface 48, with which the valve module 60 can be fastened in particular on a top-hat rail. In particular, the fastening interface 48 is arranged on the lower side of the valve module 60.

Figure 7:
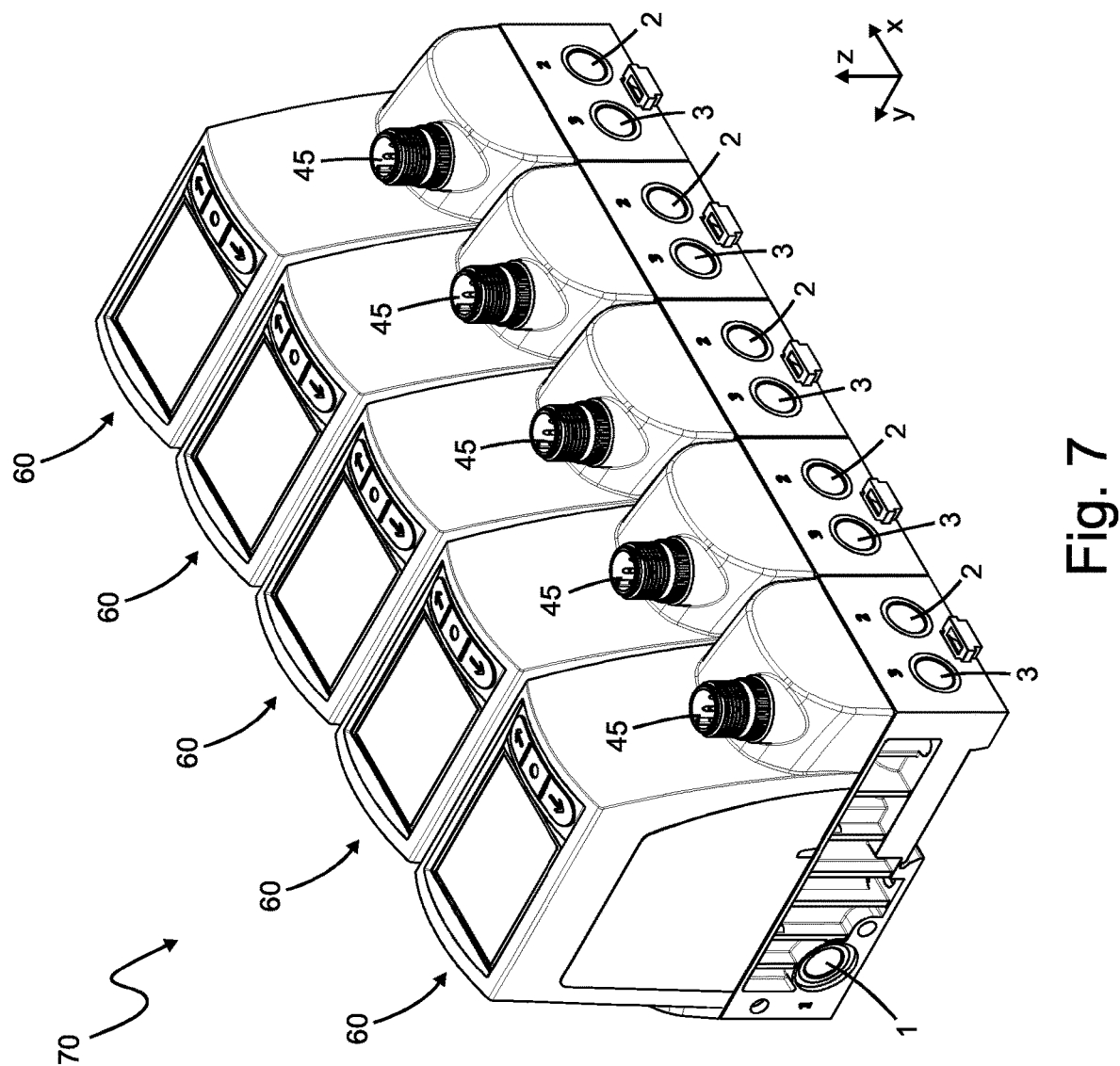

FIG. 7 shows a row module arrangement 70 which comprises a plurality of valve modules 60 which are arranged next to one another in the rowing direction x. By way of example, each valve module is designed as a valve device 40 or as a valve device 50.

What is claimed is:

1. A valve device comprising:
an outlet port;
a first valve unit with a first valve element for setting a first throttle opening for influencing a first airflow of pressurised air which is to be output at the outlet port or is to be released via the outlet port;
a first throttle control loop for the closed-loop control of the first throttle opening according to a first setpoint; and
a pressure control loop for the closed-loop pressure control of an outlet pressure present at the outlet port to a pressure setpoint amid the use of the first throttle control loop as a subordinate control loop, wherein, on closed-loop pressure control, the pressure control loop specifies, as the first setpoint, a first throttle setpoint to the first throttle control loop,
wherein the valve device is further configured to provide a throttle setting function and, within the throttle setting function, to limit the first throttle opening to a first limitation value and/or, within the throttle setting function, to specify to the first throttle control loop a first direct setpoint as the first setpoint, which first direct setpoint does not come from the closed-loop pressure control, and
wherein the first throttle opening serves for influencing the first airflow of the pressurised air which is to be output at the outlet port, wherein the valve device further comprises a second valve unit with a second valve element for setting a second throttle opening for influencing a second airflow of pressurised air which is to be released into the outlet port and a second throttle control loop for the closed-loop control of the second throttle opening according to a second setpoint, wherein the closed-loop pressure control loop is configured to further carry out the closed-loop pressure control of the outlet pressure amid the use of the second throttle control loop as a subordinate control loop and, on closed-loop pressure control, to specify a second throttle setpoint to the second throttle control loop as the second setpoint.

2. The valve device according to claim 1, wherein the valve device is configured to selectively assume:
a closed-loop pressure control mode, in which the valve device functions as a closed-loop pressure controller and carries out the closed-loop pressure control, or
a closed-loop throttle control mode, in which the valve device functions as a closed-loop throttle controller, does not carry out the closed-loop pressure control and in which the throttle setting function is activated, so that the valve device specifies the first direct setpoint to the first throttle control loop as the first setpoint.

3. The valve device according to claim 1, wherein the valve device is configured to activate, on closed-loop pressure control, the throttle setting function, in order to limit the first throttle opening to the first limitation value, and, as a response to a deactivation criterion being fulfilled, to automatically deactivate the throttle setting function.

4. The valve device according to claim 3, wherein the deactivation criterion comprises a outlet pressure threshold value for the outlet pressure.

5. The valve device according to claim 3, wherein the deactivation criterion comprises a position threshold value for the position of an actuator element which is to be actuated via the outlet pressure.

6. The valve device according to claim 1, wherein the valve device is configured to actuate an actuator element of a pneumatic actuator with the outlet pressure and, on actuation in a movement phase of the actuator, to activate the throttle setting function, in order to limit the first throttle opening to the first limitation value, and in a holding phase of the actuator element to deactivate the throttle setting function, so that the first throttle opening is not limited to the first limitation value.

7. The valve device according to claim 6, wherein the pressure control loop is configured to specify, in the holding phase, as the first setpoint a throttle setpoint which is larger than the first limitation value.

8. The valve device according to claim 1, wherein the valve device is further configured to limit, within the throttle setting function, the second throttle opening to a second limitation value and/or to specify, within the throttle setting function, a second direct setpoint to the second throttle control loop as the second setpoint, which second direct setpoint does not come from the closed-loop pressure control.

9. The valve device according to claim 1, further comprising a valve module with a valve module housing, in which the first valve unit and the second valve unit are arranged.

10. The valve device according to claim 1, further comprising a row module arrangement which comprises a plurality of valve modules which are rowed next to one another in a rowing direction, wherein one of the valve modules comprises the first valve unit.

11. A system with a valve device according to claim 1, further comprising an external outlet throttle which is connected to the outlet port, for the continuous discharge of pressurised air.

12. A system comprising two valve devices, each of the two valve devices comprising:
   an outlet port;
   a first valve unit with a first valve element for setting a first throttle opening for influencing a first airflow of pressurised air which is to be output at the outlet port or is to be released via the outlet port;
   a first throttle control loop for the closed-loop control of the first throttle opening according to a first setpoint; and
   a pressure control loop for the closed-loop pressure control of an outlet pressure present at the outlet port to a pressure setpoint amid the use of the first throttle control loop as a subordinate control loop, wherein, on closed-loop pressure control, the pressure control loop specifies, as the first setpoint, a first throttle setpoint to the first throttle control loop,
   wherein each of the two valve devices is further configured to provide a throttle setting function and, within the throttle setting function, to limit the first throttle opening to a first limitation value and/or, within the throttle setting function, to specify to the first throttle control loop a first direct setpoint as the first setpoint, which first direct setpoint does not come from the closed-loop pressure control, and
   wherein each of the two valve devices is further configured to selectively assume:
   a closed-loop pressure control mode, in which the valve device functions as a closed-loop pressure controller and carries out the closed-loop pressure control, or
   a closed-loop throttle control mode, in which the valve device functions as a closed-loop throttle controller, does not carry out the closed-loop pressure control and in which the throttle setting function is activated, so that the valve device specifies the first direct setpoint to the first throttle control loop as the first setpoint, and
   wherein the system further comprises a pneumatic actuator, wherein the pneumatic actuator comprises a first pressure chamber and a second pressure chamber and wherein the system is configured to carry out a first actuation of the pneumatic actuator and, for the first actuation, to aerate the first pressure chamber via a first valve device of the two valve devices, wherein the first valve device is in the closed-loop pressure control mode, and to de-aerate the second pressure chamber via a second valve device of the two valve devices, wherein the second valve device is in the closed-loop throttle control mode.

13. A system according to claim 12, wherein the system is further configured to carry out a second actuation of the pneumatic actuator and, for the second actuation, to de-aerate the first pressure chamber via the first valve device, wherein the first valve device is in the closed-loop throttle control mode, and to aerate the second pressure chamber via the second valve device, wherein the second valve device is in the closed-loop pressure control mode.

* * * * *